United States Patent
Wang et al.

(10) Patent No.: US 12,548,810 B2
(45) Date of Patent: Feb. 10, 2026

(54) BATTERY, ELECTRIC APPARATUS, METHOD FOR PREPARING BATTERY, AND APPARATUS FOR PREPARING BATTERY

(71) Applicant: CONTEMPORARY AMPEREX TECHNOLOGY (HONG KONG) LIMITED, Hong Kong (CN)

(72) Inventors: Lei Wang, Ningde (CN); Feng Qin, Ningde (CN); Peng Wang, Ningde (CN); Jinfeng Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 730 days.

(21) Appl. No.: 17/846,469

(22) Filed: Jun. 22, 2022

(65) Prior Publication Data

US 2022/0320613 A1 Oct. 6, 2022

Related U.S. Application Data

(63) Continuation of application No. PCT/CN2021/076278, filed on Feb. 9, 2021.

(51) Int. Cl.
*H01M 10/48* (2006.01)
*H01M 10/42* (2006.01)
(Continued)

(52) U.S. Cl.
CPC ......... *H01M 10/482* (2013.01); *H01M 10/42* (2013.01); *H01M 10/486* (2013.01);
(Continued)

(58) Field of Classification Search
CPC ............. H01M 10/482; H01M 50/503; H01M 50/507; H01M 50/528; H01M 50/543; H01M 50/548; H01M 50/569
See application file for complete search history.

(56) References Cited

U.S. PATENT DOCUMENTS 6,498,406 B1 12/2002 Horiuchi et al.
2009/0068555 A1* 3/2009 Fukuoka ............. H01M 50/516
429/160
(Continued)

FOREIGN PATENT DOCUMENTS

CN 101803067 A 8/2010
CN 102237506 A 11/2011
(Continued)

OTHER PUBLICATIONS

International Search Report of Application No. PCT/CN2021/076278, mailed Nov. 9, 2021.
(Continued)

*Primary Examiner* — Ula C Ruddock
*Assistant Examiner* — Sydney L Kline
(74) *Attorney, Agent, or Firm* — Ladas & Parry,LLP

(57) ABSTRACT

Embodiments of this application provide a battery, an electric apparatus, and a method and an apparatus for preparing a battery. The battery includes: a battery unit, including a plurality of battery cells, where the plurality of battery cells are arranged in a first direction and electrically connected to each other, each of the battery cells includes a can and two electrode terminals of opposite polarities, the two electrode terminals are respectively disposed at two ends of the can in the first direction, and at least one of the electrode terminals protrudes from the can in a direction leaving an interior of the battery cell; and a sampling member, where the sampling member is at least partially located between two adjacent ones of the battery cells, connected to the electrode terminals protruding from the can, and configured to perform signal collection on the connected battery cells.

20 Claims, 10 Drawing Sheets

(51) Int. Cl.
*H01M 50/503* (2021.01)
*H01M 50/507* (2021.01)
*H01M 50/528* (2021.01)
*H01M 50/543* (2021.01)
*H01M 50/548* (2021.01)
*H01M 50/569* (2021.01)

(52) U.S. Cl.
CPC ....... *H01M 50/503* (2021.01); *H01M 50/507* (2021.01); *H01M 50/528* (2021.01); *H01M 50/543* (2021.01); *H01M 50/548* (2021.01); *H01M 50/569* (2021.01); *H01M 2220/20* (2013.01)

(56) References Cited

U.S. PATENT DOCUMENTS

| | | | | |
|---|---|---|---|---|
| 2010/0266891 | A1* | 10/2010 | Kwon | H01R 4/26 429/159 |
| 2011/0262777 | A1* | 10/2011 | Choi | H01M 50/516 174/68.2 |
| 2012/0237807 | A1* | 9/2012 | Uchida | H01M 10/482 429/90 |
| 2015/0140393 | A1* | 5/2015 | Yamamoto | H01M 50/553 429/121 |
| 2018/0120386 | A1* | 5/2018 | Riemer | G01R 31/371 |

FOREIGN PATENT DOCUMENTS

| | | |
|---|---|---|
| CN | 208423002 U | 1/2019 |
| CN | 109659464 A | 4/2019 |
| JP | 2000268793 A | 9/2000 |
| JP | 2010108625 A | 5/2010 |
| JP | 2014120417 A | 6/2014 |
| KR | 20080090773 A | 10/2008 |

OTHER PUBLICATIONS

Written Opinion of Application No. PCT/CN2021/076278, mailed Nov. 9, 2021.
Extended European Search Report for EP application No. 21908113.0, dated Oct. 1, 2024.
Office action from corresponding Chinese Patent Application No. 202180075231.7 dated May 24, 2025, with search report.

* cited by examiner (a)

(b)

(c)

(a)

(b)

BATTERY, ELECTRIC APPARATUS, METHOD FOR PREPARING BATTERY, AND APPARATUS FOR PREPARING BATTERY

CROSS REFERENCE TO RELATED APPLICATION

This application is a continuation of International Patent Application No. PCT/CN2021/076278, filed on Feb. 9, 2021, which is incorporated by reference in its entirety.

TECHNICAL FIELD

This application relates to the field of energy storage apparatuses, and more specifically, to a battery, an electric apparatus, a method for preparing a battery, and an apparatus for preparing a battery.

BACKGROUND

Energy conservation and emission reduction are key to sustainable development of automobile industry. Under this circumstance, electric vehicles have become an important part for the sustainable development of the automobile industry due to their energy-saving and environment-friendly advantages. Battery technologies are an important factor related to the development of electric vehicles.

With continuous development of battery technologies, higher requirements are put forward for performance of batteries, and it is desired that many design factors are taken into considerations.

SUMMARY

This application provides a battery, an electric apparatus, a method for preparing a battery, and an apparatus for preparing a battery, to increase energy density of the battery and improve safety of the battery.

According to a first aspect, a battery is provided and includes: a battery unit, including a plurality of battery cells, where the plurality of battery cells are arranged in a first direction and electrically connected to each other, each of the battery cells includes a can and two electrode terminals of opposite polarities, the two electrode terminals are respectively disposed at two ends of the can in the first direction, and at least one of the electrode terminals protrudes from the can in a direction leaving an interior of the battery cell; and a sampling member, where the sampling member is at least partially located between two adjacent ones of the battery cells, connected to the electrode terminals protruding from the can, and configured to perform signal collection on the connected battery cells.

In the technical solution of this embodiment of this application, for the plurality of battery cells arranged in the first direction and electrically connected, the sampling member at least partially located between two adjacent ones of the battery cells and connected to an electrode terminal is used for signal collection. In this way, a voltage or temperature signal or the like can be collected from the battery cells in a simple structure, and safety states of the battery cells can be monitored based on the collected voltage or temperature signal. Moreover, the sampling member is partially located between the two battery cells that are electrically connected, a space occupied by the sampling member can be reduced to increase the overall energy density.

In some embodiments, in the first direction, a gap is formed between two adjacent ones of the battery cells, a connecting portion of the sampling member is located in the gap, and the connecting portion is configured to connect the electrode terminal. In this way, a vacant space between battery cells can be effectively used to dispose the sampling member, so that the structure is more compact, and the energy density of the battery is further improved.

In some embodiments, the connecting portion is connected to a circumferential side wall of the electrode terminal. By performing signal collection on the circumferential side wall of the electrode terminal protruding from the can instead of on an end face of the electrode terminal, a space for placing the sampling member can be further reduced, and the connection structure between the sampling member and the electrode terminal can be simplified.

In some embodiments, the connecting portion is elastic and configured to deform in response to an external force to attach to the circumferential side wall of the electrode terminal, so as to achieve surface contact with the electrode terminal. Because the connecting portion is elastic and can be elastically deformed to contact the surface of the electrode terminal under the action of the external force, the connecting portion can adaptively and tightly fit with the electrode terminal, and a stable electrical connection between the sampling member and the electrode terminal can be realized with a simple structure.

In some embodiments, the electrode terminal protruding from the can is cylindrical, and the connecting portion wraps the electrode terminal by an angle greater than 0 degrees and less than 180 degrees.

In some embodiments, the connecting portion is clamped to the circumferential side wall of the electrode terminal. To be specific, the connecting portion is electrically connected to the circumferential side wall of the electrode terminal by means of a clamping connection, to achieve a stable electrical connection.

In some embodiments, the connecting portion is fully attached to the circumferential side wall of the electrode terminal. Under the condition that the electrical connection is achieved through elastic deformation or clamping, by fully attaching the connecting portion to the circumferential side wall of the electrode terminal, a contact area between the connecting portion and the electrode terminal can be increased, and a good electrical connection can be achieved more stably.

In some embodiments, in the first direction, a size of the connecting portion is the same as a size of the gap. This can easily fix the connecting portion during installation of sampling member, maintain and stabilize the two adjacent cells to some extent, and limit excessive relative movement between the two battery cells, improving the structural stability.

In some embodiments, the size of the connecting portion in the first direction is greater than a size of the connecting portion in a thickness direction thereof In this way, the contact area between the connecting portion and the electrode terminal can be increased without increasing the rigidity due to the excessive thickness of the connecting portion, and the connecting portion can be easily elastically deformed to clamp to the electrode terminal.

In some embodiments, the connecting portion wraps the electrode terminal by a size greater than or equal to one half of a circumference of the side wall of the electrode terminal and less than the circumference of the circumferential side wall of the electrode terminal. The connecting portion has an opening formed for clamping the circumferential side wall of the electrode terminal and wrapping the electrode terminal in a large area, and therefore structural stability can be enhanced.

In some embodiments, the electrode terminal protruding from the can is cylindrical, and the connecting portion wraps the electrode terminal by an angle greater than or equal to 180 degrees and less than 360 degrees. The electrode terminal is cylindrical, so that the sampling member can be more easily installed on the electrode terminal.

In some embodiments, a plurality of convex portions are provided on an inner surface of the connecting portion, and are configured to clamp the circumferential side wall of the electrode terminal. In some embodiments, a plurality of concave portions corresponding to the convex portions are formed in the circumferential side wall of the electrode terminal, and the convex portions fit the concave portions. In this way, the connecting portion can be prevented from moving or rotating relative to the electrode terminal, thereby improving the connection stability.

In some embodiments, the connecting portion is provided with a through hole in the first direction, and the through hole is used to provide a deformation space when the connecting portion is clamped to the electrode terminal, so that a side of the connecting portion with the through hole close to the electrode terminal is more easily deformed, and the connecting portion is more conveniently clamped to a circumferential side surface of the electrode terminal.

In some embodiments, the connecting portion is provided with a notch, and the through hole extends to communicate with the notch. The notch of the connecting portion is used for the electrode terminal to pass through when the connecting portion is assembled with the electrode terminal. An end of the through hole extends to communicate with the notch, so that the connecting portion is easier to deform when clamping to the electrode terminal.

In some embodiments, the two electrode terminals of each of the battery cells protrude from the can in the direction leaving the interior of the battery cell, and in two adjacent ones of the battery cells, the electrode terminals of one battery cell are disposed opposite and butt up against the electrode terminals of the other battery cell. In two adjacent ones of the battery cells, the electrode terminals of one battery cell directly butt up against the electrode terminals of the other battery cell, to achieve the electrical connection, so that components for electrical connection can be reduced and the energy density of the battery can be improved.

In some embodiments, in two adjacent ones of the battery cells, the electrode terminals of one battery cell are welded together with the electrode terminals of the other battery cell. By directly welding the two protruding electrode terminals in this way, a stable electrical connection between two adjacent ones of the battery cells can be achieved.

In some embodiments, in two adjacent ones of the battery cells, the electrode terminals of one battery cell are welded together with the electrode terminals of the other battery cell, and contact zones between the sampling member and the electrode terminals and welding zones of the electrode terminals are staggered in the first direction. When the two electrode terminals are welded, uneven welding zones are often formed on the two electrode terminals. By staggering the contact zones between the sampling member and the electrode terminals and the welding zones of the electrode terminals in the first direction, the sampling member can be prevented from being connected to the welding zones to cause poor contact and lower sampling accuracy, and therefore assembly accuracy can be improved.

In some embodiments, the battery has a plurality of battery units, the plurality of battery units are arranged in a second direction, and the second direction is perpendicular to the first direction; and the sampling member has a plurality of connecting portions arranged in the second direction, and each of the connecting portion is connected to a circumferential side wall of the electrode terminal of a corresponding battery unit. To be specific, a plurality of battery cells are arranged in the first direction to form one battery unit, and a plurality of battery units are arranged in the second direction, so that the plurality of battery cells are arranged in a matrix. The sampling member has the plurality of connecting portions arranged in the second direction, and each connecting portion is connected to the circumferential side wall of the electrode terminal of the corresponding battery cell. Therefore, the sampling member may simultaneously collect electrical signals from the plurality of battery cells arranged in the second direction, and the electrode terminals of the plurality of battery cells that are electrically connected to a plurality of connecting portions of one sampling member can have an equal potential, thereby achieving voltage balance of the battery cells and improving consistency of the battery cells.

In some embodiments, the battery further has an installation plate, where two ends of the installation plate in the first direction are respectively connected to cans of two adjacent ones of the battery cells, and the installation plate is configured to fix to the sampling member. The sampling member is fixed to the installation plate, so that the sampling member can be fixed firmly.

In some embodiments, the installation plate has an installation portion and two extension portions, where the installation portion is connected between the two extension portions and configured to fix to the sampling member, and the two extension portions are respectively overlapped with the cans of two adjacent ones of the battery cells. In this way, the sampling member can be stably installed relative to the battery cells in a simple structure.

In some embodiments, the installation portion is recessed toward the gap to form a groove. In this way, a circuit component for transmitting an electrical signal can be arranged in a space of the groove, thereby improving space utilization and increasing the energy density of the battery.

In some embodiments, the sampling member further has a fixing portion, where the fixing portion passes through the installation portion and is fixed to the installation portion.

In some embodiments, the installation portion is engaged with the gap, and in the first direction, a width of the connecting portion is equal to a width of the gap. In this way, during installation of the installation plate, the installation portion can be used for fixing, and two adjacent ones of the battery cells can be prevented from moving.

In some embodiments, the extension portion is in a flat plate shape and is adhered to the can of the battery cell. Thus, the installation plate can be disposed stably relative to the can of the battery cell to improve the structural stability.

According to a second aspect, an electric apparatus is provided and includes the battery according to the first aspect. The battery is configured to provide electric energy.

According to a third aspect, a method for preparing a battery is provided and includes: providing a battery unit, where the battery unit includes a plurality of battery cells, the plurality of battery cells are arranged in a first direction and electrically connected to each other, each of the battery cells includes a can and two electrode terminals of opposite polarities, the two electrode terminals are respectively disposed at two ends of the can in the first direction, and at least one of the electrode terminals protrudes from the can in a direction leaving an interior of the battery cell; and providing a sampling member, where the sampling member is at least partially located between two adjacent ones of the battery cells, connected to the electrode terminals protruding from the can, and configured to perform signal collection on the connected battery cells.

According to a fourth aspect, an apparatus for preparing a battery is provided and includes: a first providing module, configured to provide a battery unit, where the battery unit includes a plurality of battery cells, the plurality of battery cells are arranged in a first direction and electrically connected to each other, each of the battery cells includes a can and two electrode terminals of opposite polarities, the two electrode terminals are respectively disposed at two ends of the can in the first direction, and at least one of the electrode terminals protrudes from the can in a direction leaving an interior of the battery cell; a second providing module, configured to provide a sampling member; and an installation module, configured to install the sampling member to the battery cell, where the sampling member is at least partially located between two adjacent ones of the battery cells, connected to the electrode terminals protruding from the can, and configured to perform signal collection on the connected battery cells.

BRIEF DESCRIPTION OF DRAWINGS

The drawings described herein are intended for a further understanding of this application and constitute a part of this application. Example embodiments of this application and descriptions thereof are intended to explain this application, and do not constitute any inappropriate limitation on this application. In the accompanying drawings:

FIG. 6(a) is a schematic three-dimensional structural diagram of the sampling member and the installation plate that are separated from each other, FIG. 6(b) is a schematic structural side view of the sampling member and the installation plate that are installed between two adjacent ones of the battery cells, and FIG. 6(c) is a schematic three-dimensional structural diagram of the sampling member and the installation plate that are integrated together;

FIG. 7(a) is a schematic diagram of a three-dimensional structure that the sampling member is installed to an installation plate, and FIG. 7(b) is a schematic diagram of a three-dimensional structure of the sampling member;

FIG. 8(a) is a schematic three-dimensional structural diagram of the sampling member and the installation plate that are separated from each other, FIG. 8(b) is a schematic structural side view of the sampling member and the installation plate that are installed between two adjacent ones of the battery cells, and FIG. 8(c) is a schematic three-dimensional structural diagram of the sampling member and the installation plate that are integrated together;

FIG. 9(a) shows a state in which the sampling member is not in contact with electrode terminals, and FIG. 9(b) shows a state in which the sampling member is in contact with the electrode terminals;

DETAILED DESCRIPTION

Figure 1:
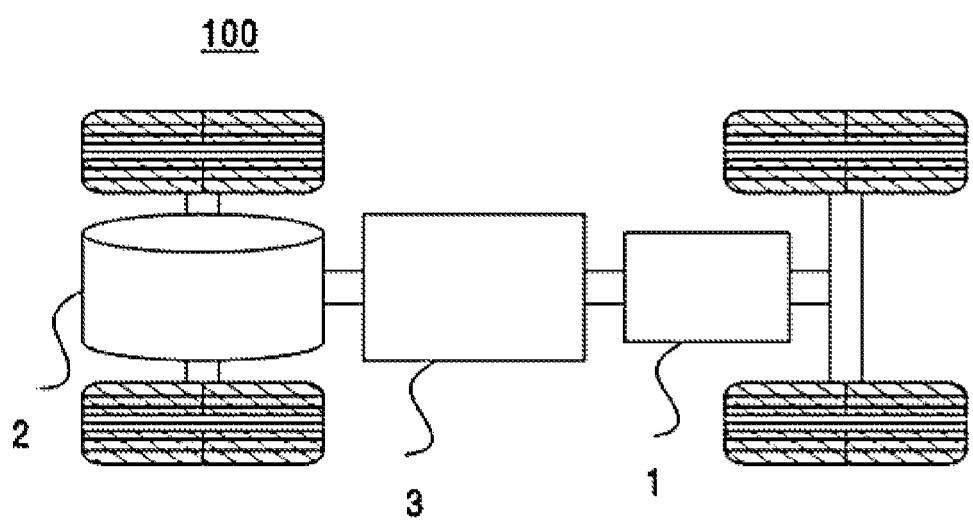
FIG. 1 is a schematic diagram of a vehicle according to an embodiment of this application.

To make the objectives, technical solutions, and advantages of the embodiments of this application clearer, the following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application belongs. The terms used in the specification of this application are merely intended to describe the specific embodiments but not intended to constitute any limitation on this application. The terms "include", "comprise", and any variations thereof in the specification and claims of this application and the foregoing description of the drawings are intended to cover non-exclusive inclusions. In the specification and claims or the foregoing description of the drawings of this application, the terms "first", "second", and so on are intended to distinguish between different objects but do not indicate a particular order or a primary-secondary relationship.

The term "embodiment" described in this application means that specific features, structures or characteristics in combination with descriptions of the embodiments may be incorporated in at least one embodiment of this application. The word "embodiment" in various positions in the specification does not necessarily refer to a same embodiment, or an independent or alternative embodiment that is exclusive of other embodiments. Persons skilled in the art explicitly and implicitly understand that the embodiments described in this application may combine with another embodiment.

In the descriptions of this application, it should be noted that unless otherwise specified and defined explicitly, the terms "installment", "link", "connection", and "attachment" should be understood in their general senses. For example, the terms may be a fixed connection, a detachable connection, or an integrated connection, or may be a direct connection, or an indirect connection through an intermediate medium, or a communication between two elements. A person of ordinary skill in the art can understand specific meanings of these terms in this application based on specific situations.

The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

In this application, "a plurality of" means two (inclusive) or more. Similarly, "a plurality of groups" means two (inclusive) or more groups, and "a plurality of pieces" means two (inclusive) or more pieces.

The battery mentioned in the embodiments of this application refers to an individual physical module that includes more battery cells for providing a higher voltage and capacity. For example, the battery mentioned in this application may include a battery module, a battery pack, or the like.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. A current collector uncoated with the positive electrode active substance layer bulges out of a current collector coated with the positive electrode active substance layer, and the current collector uncoated with the positive electrode active substance layer is used as a positive tab. Using the lithium-ion battery as an example, a material of the positive electrode current collector may be aluminum, and the positive electrode active substance may be lithium cobalt oxide, lithium iron phosphate, ternary lithium, lithium manganate oxide, or the like. The negative electrode plate includes a negative electrode current collector and a negative electrode active substance layer. The negative electrode active substance layer is applied on a surface of the negative electrode current collector. A current collector uncoated with the negative electrode active substance layer bulges out of a current collector coated with the negative electrode active substance layer, and the current collector uncoated with the negative electrode active substance layer is used as a negative tab. A material of the negative electrode current collector may be copper, and the negative electrode active substance can be carbon, silicon, or the like. To allow a large current to pass without any fusing, a plurality of positive tabs are provided and stacked together, and a plurality of negative tabs are provided and are stacked together. The separator may be made of PP, PE, or the like. In addition, the electrode assembly may have a winding structure or a laminated structure. This embodiment of this application is not limited thereto.

The development of battery technologies should consider many design factors, for example, performance parameters such as energy density, cycle life, discharge capacity, and charge and discharge rate. In addition, safety of batteries needs to be considered.

At present, a battery of an electric vehicle often requires tens or even hundreds of battery cells.

In practical applications, due to minor differences in some parameters (for example, voltage, internal resistance, and SOC (state of charge)) between battery cells, as the use time increases, differences between the battery cells become increasingly large.

If these differences are left unchecked, consistency of the battery cells will be worse, affecting performance of the battery, and even causing serious consequences, even causing fires, explosions, and other accidents. Therefore, a sampling apparatus is installed in the battery, and corresponding control and treatment can be made under the condition that abnormality is found.

In the prior art, an outer shell of a battery cell is usually electrically connected to a positive electrode plate or a negative electrode plate, and a sampling ring is sleeved on and in contact with the outer shell of the battery cell to perform signal collection. The sampling ring is sleeved on the outer shell of the battery cell, and therefore the sampling ring takes up a large space, resulting in a decrease in the energy density of the battery.

In view of this, this application provides a technical solution, a battery, including: a battery unit, including a plurality of battery cells, where the plurality of battery cells are arranged in a first direction and electrically connected to each other, each of the battery cells includes a can and two electrode terminals of opposite polarities, the two electrode terminals are respectively disposed at two ends of the can in the first direction, and at least one of the electrode terminals protrudes from the can in a direction leaving an interior of the battery cell; and a sampling member, where the sampling member is at least partially located between two adjacent ones of the battery cells, connected to the electrode terminals protruding from the can, and configured to perform signal collection on the connected battery cells.

In this way, a voltage or temperature signal or the like can be collected from the battery cells in a simple structure, and safety states of the battery cells can be monitored based on the collected voltage or temperature signal. In addition, the at least one electrode terminal protrudes from the can in the direction leaving the interior of the battery cell, and the sampling member is at least partially located between two adjacent ones of the battery cells, so that an original empty space between the two battery cells can be used for installing the sampling member, to make full use of the space inside the battery, so as to increase the overall energy density of the battery.

An embodiment of this application provides an electric apparatus, and a battery is configured to provide electric energy.

The technical solutions described in the embodiments of this application are applicable to various apparatuses that use batteries, such as mobile phones, portable devices, notebook computers, electric bicycle, electric toys, electric tools, electric vehicles, ships, and spacecrafts. For example, spacecrafts include airplanes, rockets, space shuttles, and spaceships.

It should be understood that the technical solutions described in the embodiments of this application are not only applicable to the devices described above, but also applicable to all devices that use batteries. However, for brevity of description, the following embodiments are all described by using an electric vehicle as an example.

For example, FIG. 1 is a schematic structural diagram of a vehicle 100 according to an embodiment of this application. The vehicle 100 may be a fuel vehicle, a gas vehicle, or a new energy vehicle, and the new energy vehicle may be a battery electric vehicle, a hybrid electric vehicle, an extended range electric vehicle, or the like. A motor 2, a controller 3, and a battery 1 may be arranged inside the vehicle 100, where the controller 3 is configured to control the battery 1 to supply power to the motor 2. For example, the battery 1 may be arranged at the bottom of or the front or rear of the vehicle 100. The battery 1 may be configured to supply power to the vehicle 100. For example, the battery 1 may be used as an operational power supply for the vehicle 100 and used for a circuit system of the vehicle 100, for example, for a working electricity demand during start, navigation, and operation of the vehicle 100. In another embodiment of this application, the battery 1 may be used not only as the operational power supply for the vehicle 100 but also as a driving power supply for the vehicle 100, completely or partially replacing the fossil fuel or the natural gas to provide driving power for the vehicle 100.

To meet different power usage requirements, the battery 1 may include a plurality of battery cells 20, where the plurality of battery cells 20 may be connected in series, parallel, or series and parallel, and being connected in series and parallel refers to a combination of series and parallel connections.

Figure 2:
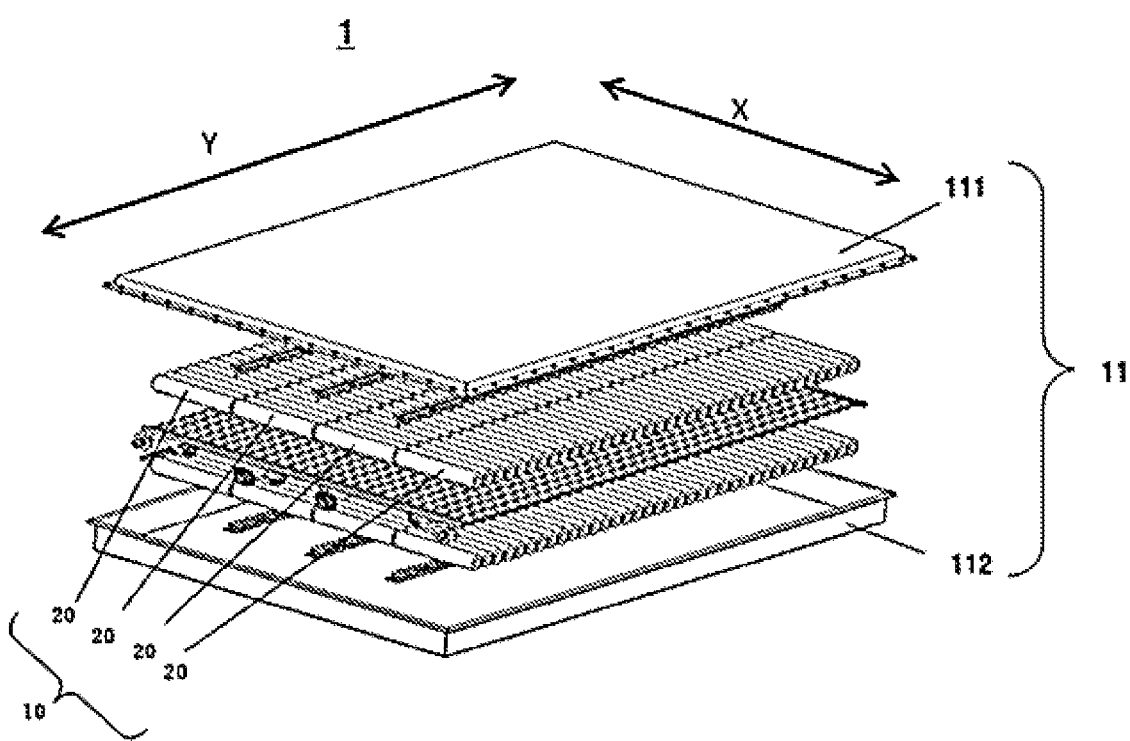
FIG. 2 is a schematic structural diagram of a battery according to an embodiment of this application.

For example, FIG. 2 is a schematic structural diagram of a battery 1 according to an embodiment of this application. The battery 1 may include a plurality of battery units 10, and each battery unit 10 includes a plurality of battery cells 20 arranged in a first direction X and electrically connected to each other. The plurality of battery units 10 are arranged in a second direction Y. The second direction Y is perpendicular to the first direction X. To be specific, the plurality of battery cells 20 in the battery 1 are arranged in a matrix structure. Optionally, the battery 1 may alternatively have only one battery unit 10, and the battery unit 10 includes a plurality of battery cells 20 arranged in the first direction X and electrically connected to each other. The battery 1 may further include a box body 11, the box body 11 has a hollow structure inside, and the plurality of battery cells 20 are accommodated in the box body 11. As shown in FIG. 2, the box body 11 may include two parts, which are referred to herein as an upper cover 111 and a box shell 112 respectively. The upper cover 111 and the box shell 112 are interlocked. Shapes of the upper cover 111 and the box shell 112 may be determined depending on a shape in which the plurality of battery cells 20 are combined. For example, the upper cover 111 and the box shell 112 may both be hollow cuboids, each with only one surface used as an opening surface, an opening of the upper cover 111 and an opening of the box shell 112 are disposed oppositely, and the upper cover 111 and the box shell 112 are interlocked to form the box body with a closed chamber. Alternatively, the upper cover 111 is a cuboid with an opening and the box shell 112 is in a plate shape, or the box shell 112 is a cuboid with an opening and the upper cover 111 is in a plate shape, and the upper cover 111 and the box shell 112 are disposed oppositely and interlocked to form the box body with a closed chamber. After the plurality of battery cells 20 are connected in parallel, series, or series and parallel, they are placed in the box body formed after the upper cover 111 and the box shell 112 are interlocked.

Figure 3:
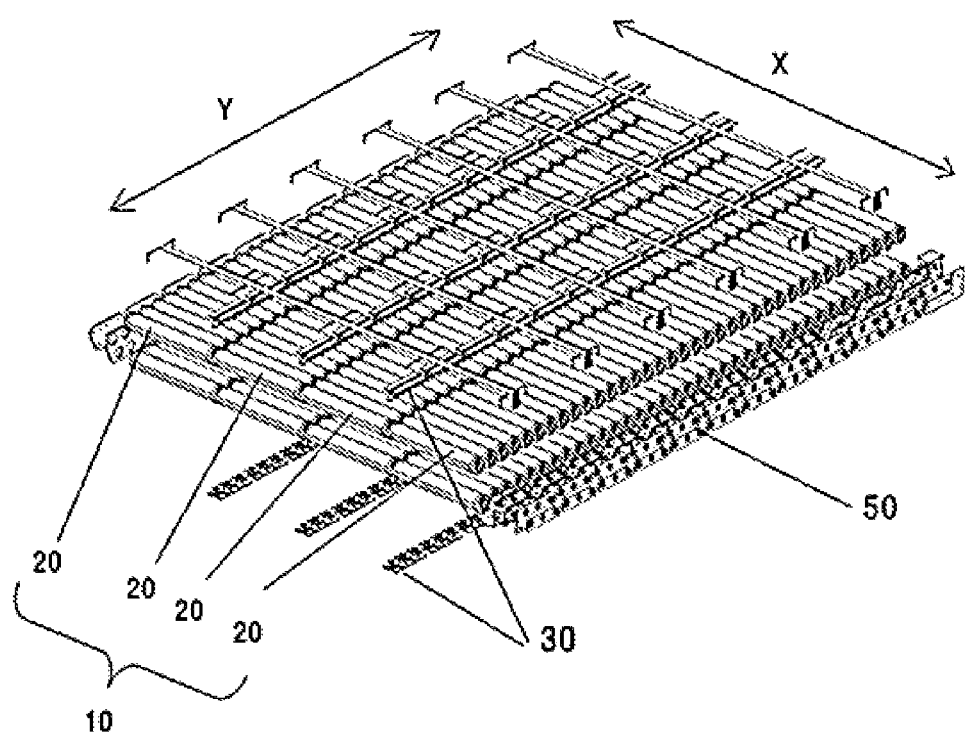
FIG. 3 is a schematic structural diagram of a plurality of battery cells arranged in a matrix according to an embodiment of this application.

As shown in FIG. 3, the plurality of battery cells 20 are arranged in the first direction X and electrically connected to each other to form the battery unit 10. Specifically, the battery unit 10 is formed by connecting the plurality of battery cells 20 in series. The plurality of battery units 10 are arranged in the second direction Y, and the plurality of battery units 10 are electrically connected to each other through a bus component 50.

Figure 4:
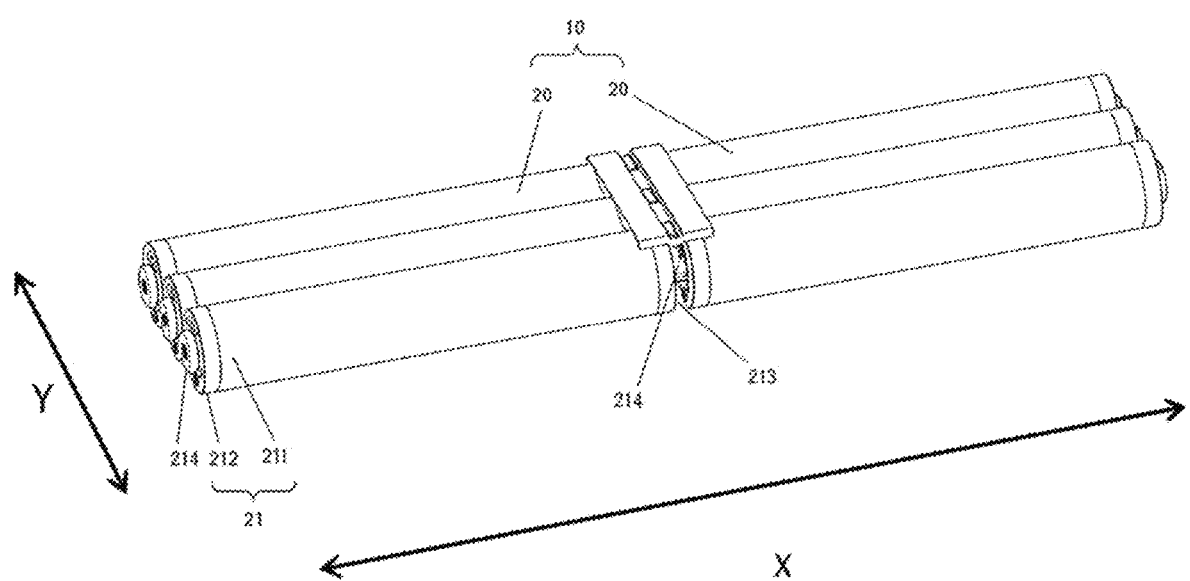
FIG. 4 is a schematic structural diagram of a plurality of battery units according to an embodiment of this application.

FIG. 4 is a schematic structural diagram of a plurality of battery units 10 (in FIG. 4, three battery units 10 are shown, and two battery cells 20 are shown for each battery unit 10) according to an embodiment of this application.

The battery cell 20 includes a can 21, two electrode terminals 214 of opposite polarities, and one or more electrode assemblies (not shown) disposed in the can 21. A shape of the can 21 is determined depending on a shape in which one or more electrode assemblies are combined. For example, a shape of the can 21 may be a cuboid, cube, or cylinder. The can 21 includes a housing 211 and an end cap 212. An opening is provided at an end of the housing 211 in the first direction X, so that one or more electrode assemblies can be placed in the can 21 from the opening, and the opening is closed with the end cap 212. The can 21 is filled with an electrolyte, such as a liquid electrolyte. As shown in FIG. 4, an opening is provided at each of two ends of the housing 211 in the first direction X, the can 21 includes two end caps 212, and the two end caps 212 close the openings respectively at the two ends of the housing 211.

Two electrode terminals 214 are a positive electrode terminal and a negative electrode terminal, and respectively disposed at two ends of the can 21 in the first direction. Specifically, the two electrode terminals 214 are respectively disposed on the two end caps 212, and at least one of the electrode terminals 214 protrudes from the can 21 in a direction leaving the interior of the battery cell 20. The two electrode terminals 214 are respectively disposed on the two end caps 212, and the electrode terminals 214 may be insulated from the end caps 212. Therefore, the can 21 may be insulated from a positive electrode and/or a negative electrode, and is not charged. Under the condition that the can 21 is not charged, a probability of short circuit can be reduced, thereby improving safety performance of the battery cell 20.

As shown in FIG. 4, the plurality of battery cells 20 (two battery cells shown in FIG. 4) are arranged in the first direction X and electrically connected to each other to form the battery unit 10. In this embodiment, the electrode terminals 214 of each of the two battery cells 20 that are electrically connected protrude from the can 21 in the direction leaving the interior of the battery cells 20. It should be noted that, alternatively, the electrode terminals 214 of one of the two battery cells 20 may protrude from the can 21 in the direction leaving the interior of the battery cell 20, and the electrode terminals 214 of the other battery cell 20 are flush with the end cap 212. Alternatively, the two electrode terminals 214 of each battery cell 20 protrude from the can 21 in the direction leaving the interior of the battery cell 20. In this embodiment, the electrode terminals 214 of one battery cell 20 are directly connected to the electrode terminals 214 of the other battery cell 20 to achieve electrical connection. It should be noted that the electrical connection of the two battery cells 20 may alternatively be achieved by means of a connection structure such as a connecting piece. The electrode terminal 214 may have various shapes such as cylinder, rectangular solid, cuboid, and polygonal cylinder. The electrode terminal shown in this embodiment is a cylindrical structure. A shape of the battery cell 20 may be a cuboid, cube, or cylinder, and the battery cell shown in this embodiment is a cylindrical structure. When a shape of the battery cell is a cylinder, the above-mentioned "first direction" in this application is an axial direction of the battery cell.

Figure 5:
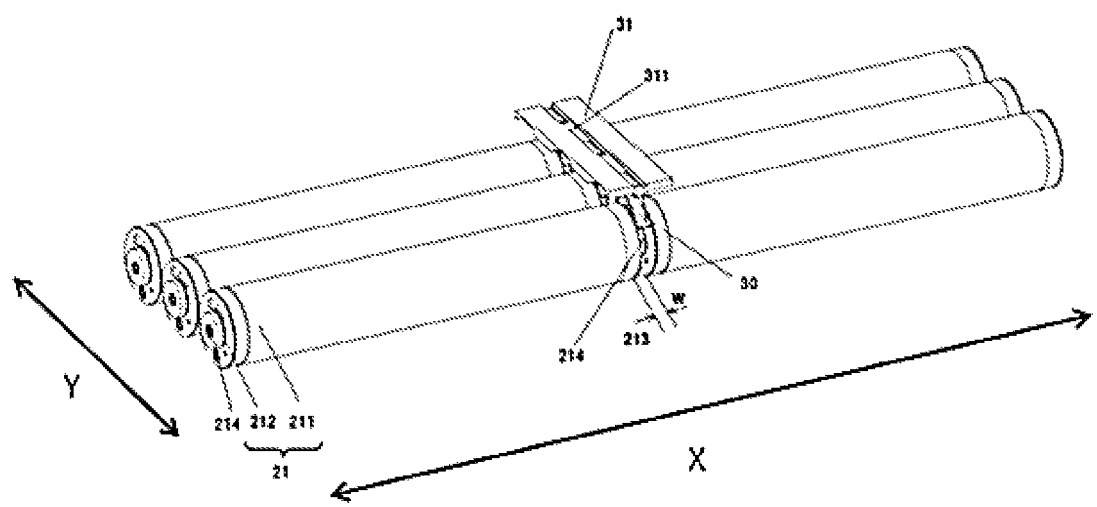
FIG. 5 is a schematic structural diagram of a sampling member between two battery cells according to an embodiment of this application.

FIG. 5 is a schematic structural diagram of a sampling member 30 between two battery cells 20 according to an embodiment of this application.

In the first direction X, the sampling member 30 is at least partially located between two adjacent ones of the battery cells 20, connected to the electrode terminals 214 protruding from the can 21, and configured to perform signal collection on the connected battery cells 20. Specifically, in the first direction X, a gap 213 is formed between the cans 21 of two adjacent ones of the battery cells 20, and the sampling member 30 is at least partially located in the gap 213.

The battery 1 further has an installation plate 31, and two ends of the installation plate 31 in the first direction X are respectively connected to the cans 21 of two adjacent ones of the battery cells 20, so that the installation plate 31 is connected to the battery cells 20.

Figure 6:
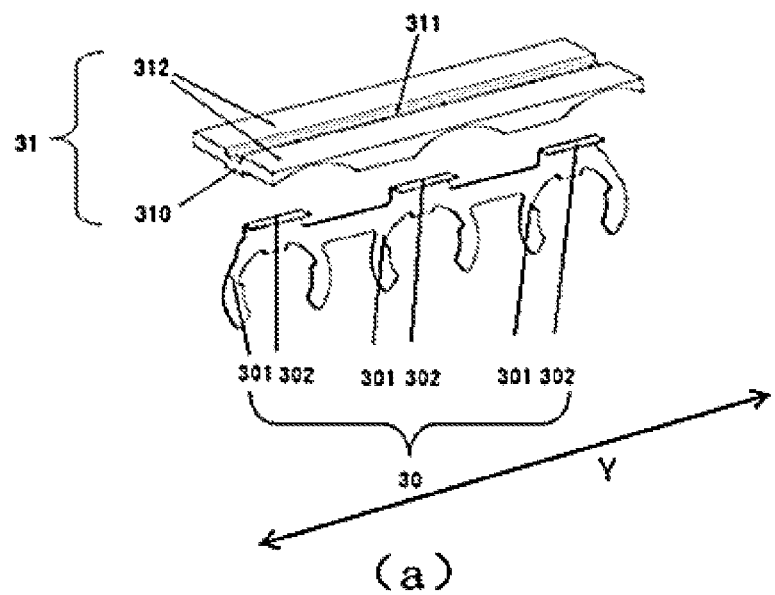
FIG. 6 is a schematic structural diagram of assembling a sampling member and an installation plate according to an embodiment of this application, where
Figure 6:
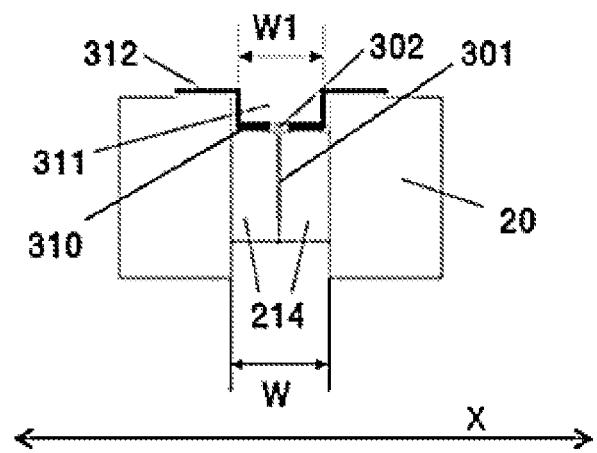
Figure 6:
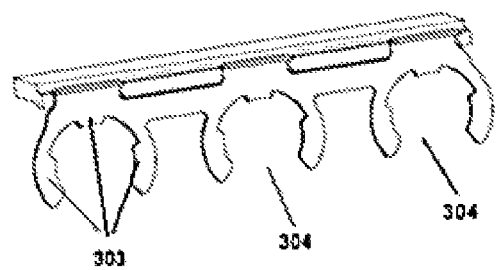

FIG. 6 is a schematic structural diagram of assembling the sampling member 30 and the installation plate 31 according to an embodiment of this application. FIG. 6(a) is a schematic three-dimensional structural diagram of the sampling member 30 and the installation plate 31 that are separated from each other according to this embodiment, FIG. 6(b) is a schematic structural side view of the sampling member 30 and the installation plate 31 that are installed between two adjacent ones of the battery cells 20 according to this embodiment, and FIG. 6(c) is a schematic three-dimensional structural diagram of the sampling member 30 and the installation plate 31 that are integrated together according to this embodiment.

As shown in FIG. 6(a), the installation plate 31 has an installation portion 310 and two extension portions 312, and the installation portion 310 is connected between the two extension portions 312 and is used for fixing with the sampling member 30. The sampling member 30 has a connecting portion 301 and a fixing portion 302. An extending direction of the fixing portion 302 intersects an extending direction of the connecting portion 301, so that the sampling member 30 is formed in, for example, a 7-shape or a T-shape.

One sampling member 30 may have a plurality of connecting portions 301 arranged in the second direction Y, and each connecting portion 301 is connected to a circumferential side wall of the electrode terminal 214 of the corresponding battery unit 10 arranged in the second direction Y. Moreover, correspondingly, the installation plate 31 also extends in the second direction Y so that a plurality of sampling members 30 can be installed. FIG. 6(a) shows a structure in which the sampling member 30 has three connecting portions 301. Therefore, the sampling member 30 may simultaneously collect electrical signals from the plurality of battery cells 20 arranged in the second direction Y, and the electrode terminals 214 of the plurality of battery cells 20 that are electrically connected to a plurality of connecting portions 301 of one sampling member 30 can have an equal potential, thereby achieving voltage balance of the battery cells 20 and improving consistency of the battery cells 20.

As shown in FIG. 6(b), the two extension portions 312 of the installation plate 31 are respectively overlapped with the cans 21 of two adjacent ones of the battery cells 20. The extension portion 312 is in a flat plate shape. The extension portion 312 is adhered to the can 21 of the battery cell 20, so as to fix the installation plate 31 to the can 21. The installation portion 310 of the installation plate 31 is recessed toward the gap 213 to form a groove 311. Due to the existence of the groove 311, a circuit component for transmitting an electrical signal can be arranged in a space of the groove 311, thereby improving space utilization and increasing the energy density of the battery.

The installation portion 310 is engaged with the gap 213. In the first direction X, a width W1 of the installation portion 310 is substantially equal to a width W of the gap 213. In this way, during installation of the installation plate 31, the installation portion 310 can be used for fixing, and prevent two adjacent ones of the battery cells 20 from moving.

The electrode terminal 214 includes two end faces disposed in the first direction X and a circumferential side wall connecting the two end faces. The connecting portion 301 of the sampling member 30 is connected to the circumferential side wall of the electrode terminal 214 for signal collection. The fixing portion 302 of the sampling member 30 passes through the installation portion 310 and is fixed to the installation portion 310, thereby fixing the sampling member 30 to the installation plate 31. In this application, the shape of the electrode terminal 214 may be a cylinder, cuboid, cube, polygonal cylinder, or other various shapes. Under the condition that a shape of the electrode terminal described in this embodiment is a cylinder, the circumferential side wall is a circumferential side of the cylinder.

The installation plate 31 and the sampling member 30 may be integrally formed through in-mold injection or the like, or may be separate structures and connected together through clamping, or may be connected through hot pressing riveting or the like.

The installation plate 31 is made of, for example, polycarbonate (Polycarbonate) and polyacrylonitrile (ABS) materials to have an insulating function, and the sampling member 30 is made of, for example, aluminum alloy or steel, and is configured to collect and transmit signals. The signal collected by the sampling member 30 is transmitted through a flexible flat cable (for example, FFC) or a flexible printed circuit board (for example, FPC) to a signal processor or the like for processing. The sampling member 30 is exposed to an upper surface of the installation plate 31 to facilitate the flexible flat cable (or flexible printed circuit board) to contact the sampling member 30 and transmit the collected signal. In addition, the extension portion 312 of the installation plate 31 shown in this embodiment of this application is in a flat plate form in its part that is in contact with the can of the battery cell 20, but the structure of the installation plate 31 is not limited thereto, and can also be in a curve plate form that matches a shape of the circumferential side of the can of the battery cell 20 in contact. Moreover, the battery 1 may further include a temperature sampler. The temperature sampler may be disposed on the installation plate 31, to be in contact with the can 21 of the battery cell 20 for temperature measurement.

In this embodiment, the connecting portion 301 is clamped to the circumferential side wall of the electrode terminal 214. As shown in FIG. 6(c), the connecting portion 301 is formed with a notch 304 on the side opposite the installation plate 31, and the notch 304 is elastic. When the connecting portion 301 is assembled with the electrode terminal 214, the notch 304 is first opened through elastic deformation, and then clamped to the circumferential side wall of the electrode terminal 214 and assembled with the electrode terminal 214. After the assembly, an elastic restoring force of the notch 304 can be used to maintain the engagement with the electrode terminal 214, so as to closely fit the electrode terminal 214. Such an installation structure is simple and convenient, and no additional fixing structure is required. In addition, the gap 213 between the two battery cells 20 can be fully used without occupying too much configuration spaces of the battery cells 20, so that the energy density of the battery can be increased accordingly.

To achieve a stable electrical connection, the connecting portion 301 wraps the electrode terminal 214 by a size greater than or equal to one half of a circumference of the circumferential side wall of the electrode terminal 214 and less than the circumference of the circumferential side wall of the electrode terminal 214. The connecting portion 301 has the notch 304 formed for clamping the circumferential side wall of the electrode terminal 214 and wrapping the electrode terminal 214 in a large area, and therefore structural stability can be enhanced.

When the electrode terminal 214 protruding from the can 21 is cylindrical, the connecting portion 301 wraps the electrode terminal 214 by an angle greater than or equal to 180 degrees and less than 360 degrees. The electrode terminal 214 is cylindrical, so that the sampling member 30 can be more easily installed on the electrode terminal 214.

As shown in FIG. 6(*c*), a plurality of convex portions 303 may be provided on an inner surface of the sampling member 30 for clamping the circumferential side surface of the electrode terminal 214. To further improve the accuracy and stability in assembling the sampling member 30 and the electrode terminal 214, a plurality of concave portions corresponding to the convex portions 303 are formed in the circumferential side wall of the electrode terminal 214, and the concave portions fit the convex portions 303. In this way, the connecting portion 301 can be prevented from moving or rotating relative to the electrode terminal 214, thereby improving the connection stability.

Figure 7:
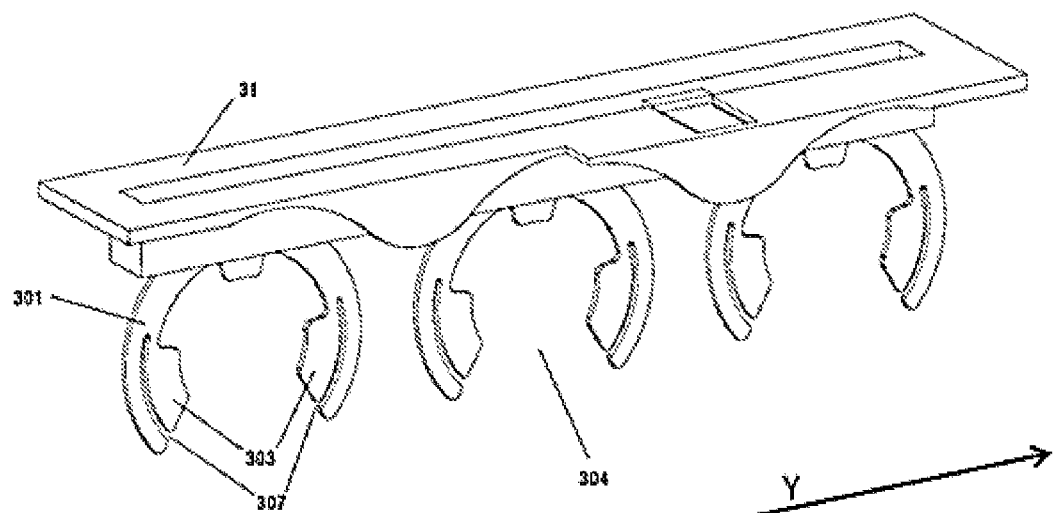
FIG. 7 is a schematic structural diagram of a sampling member according to another embodiment of this application, where
Figure 7:
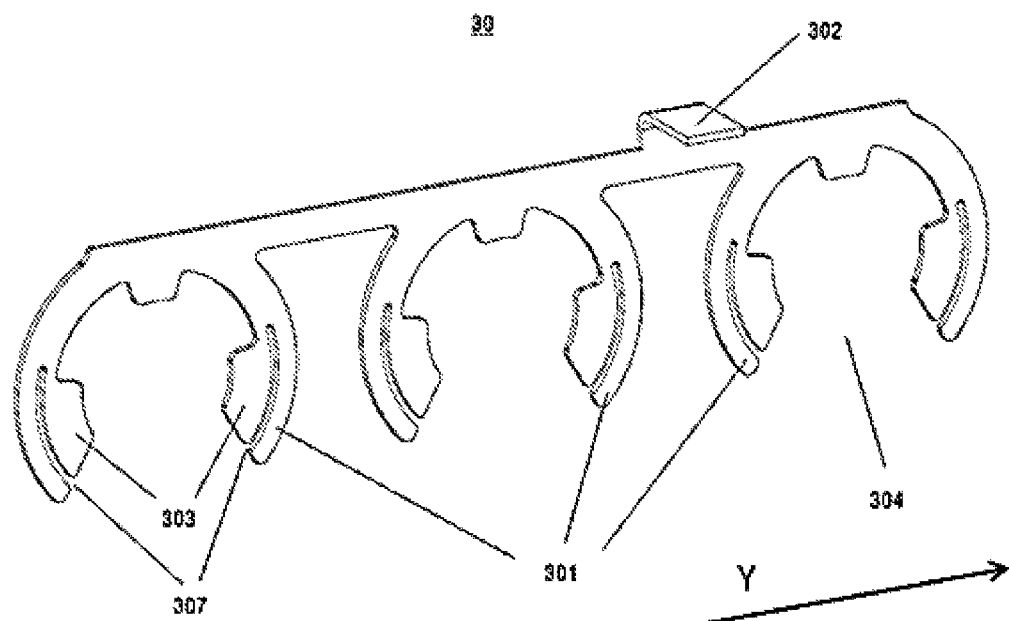

FIG. 7 is a schematic structural diagram of the sampling member according to another embodiment of this application, where FIG. 7(*a*) is a schematic three-dimensional structural diagram of the sampling member 30 installed to an installation plate 31, and FIG. 7(*b*) is a schematic three-dimensional structural diagram of the sampling member 30.

As shown in FIG. 7(*a*) and FIG. 7(*b*), the connecting portion 301 is provided with a through hole 307 in the first direction X, and the through hole 307 is used to provide a deformation space under the condition that the connecting portion 301 is clamped to the electrode terminal 214, so that a side of the connecting portion 301 with the through hole 307 close to the electrode terminal 214 is more easily deformed, and the connecting portion 301 is more conveniently clamped to a circumferential side surface of the electrode terminal 214. As shown in FIG. 7(*a*), under the condition that the electrode terminal 214 is cylindrical, a projection of the through hole 307 in the first direction X is arc-shaped. In a circumferential direction of the electrode terminal 214, a size of the through hole 307 is greater than or equal to a size of the convex portion 303. However, this is not limited thereto, and the through hole 307 may alternatively be formed in other shapes such as a stripe shape.

The connecting portion 301 is formed with a notch 304. The notch 304 is configured to allow the electrode terminal 214 to pass through when the connecting portion 301 is assembled with the electrode terminal 214, so that the connecting portion 301 is clamped to the electrode terminal. In this embodiment, an end of the through hole 307 extends to communicate with the notch 304, so that the connecting portion 301 is easier to deform when clamping to the electrode terminal 214.

In addition, FIG. 6(*a*) shows a structure in which each connecting portion 301 of the sampling member 30 is installed to the installation plate 31 by using the fixing portion 302. However, as shown in FIG. 7(*b*), one fixing portion 302 may alternatively be shared in the sampling member 30 having the plurality of connecting portions 301 arranged in the second direction Y.

Figure 8:
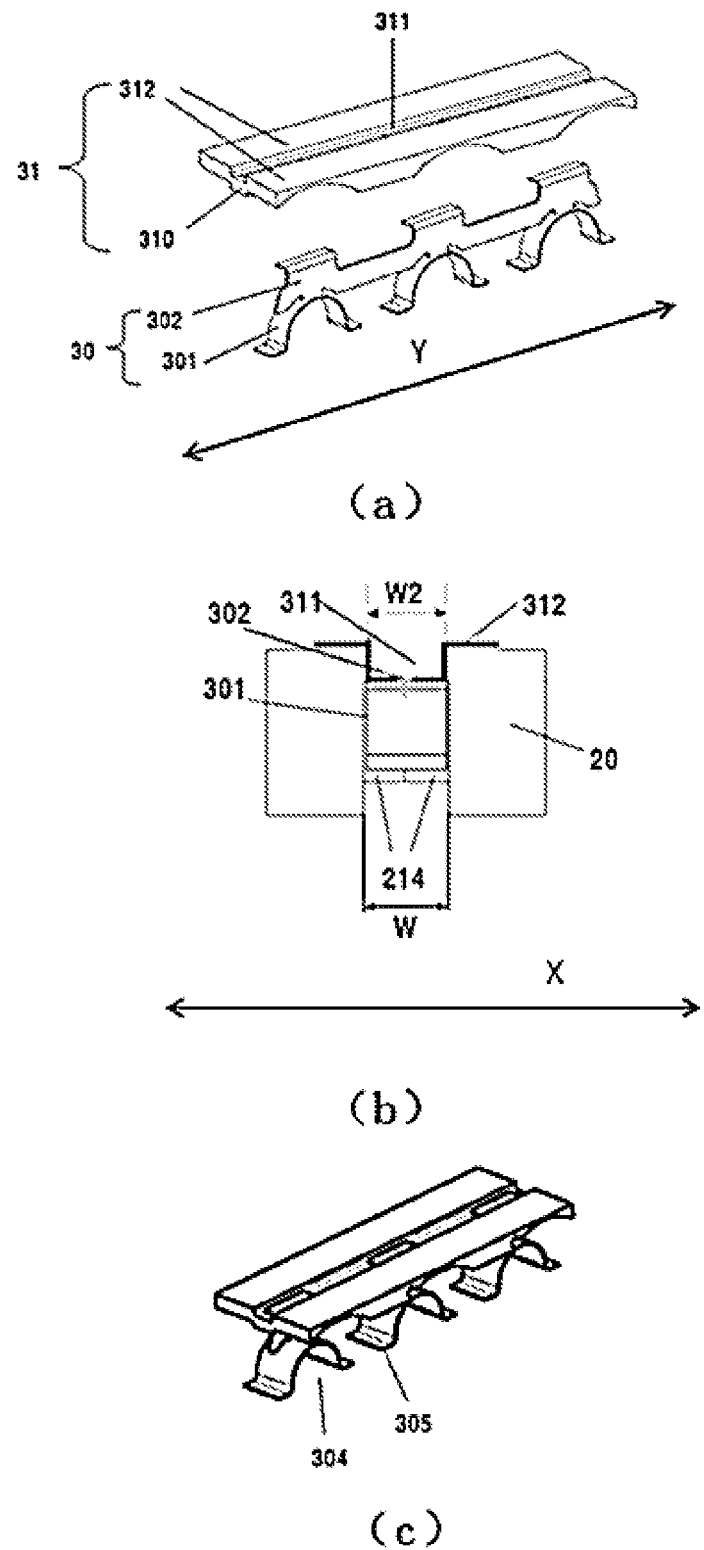
FIG. 8 is a schematic structural diagram of assembling a sampling member and an installation plate according to another embodiment of this application, where

FIG. 8 is a schematic structural diagram of assembling the sampling member 30 and the installation plate 31 according to another embodiment of this application. FIG. 8(*a*) is a schematic three-dimensional structural diagram of the sampling member 30 and the installation plate 31 that are separated from each other according to this embodiment, FIG. 8(*b*) is a schematic structural side view of the sampling member 30 and the installation plate 31 that are installed between two adjacent ones of the battery cells 20 according to this embodiment, and FIG. 8(*c*) is a schematic three-dimensional structural diagram of the sampling member 30 and the installation plate 31 that are integrated together according to this embodiment.

In this embodiment, the connecting portion 301 of the sampling member 30 is fully attached to the circumferential side wall of the electrode terminal 214. Further, in the first direction X, a size W2 of the connecting portion 301 is substantially equal to a size W of the gap 213. In this way, the connecting portion 301 can be exactly clamped to the gap 213 between the two battery cells 20. A size W2 of the connecting portion 301 in the first direction X is greater than a size of the connecting portion 301 in its thickness direction. For example, under the condition that the connecting portion 301 is formed in a ring shape in FIG. 8(*c*), a thickness of the connecting portion 301 in the thickness direction is a thickness of the connecting portion 301 in a radial direction. In this way, the contact area between the connecting portion 301 and the electrode terminal 214 can be increased without increasing the rigidity due to the excessive thickness of the connecting portion 301, and the connecting portion 301 can be easily elastically deformed to clamp to the electrode terminal 214.

In this embodiment, similar to the embodiment shown in FIG. 6, the connecting portion 301 is engaged with the circumferential side wall of the electrode terminal 214. The connecting portion 301 is formed with a notch 304 on a side opposite the installation plate 31, and the notch 304 is elastic. When the connecting portion 301 is assembled with the electrode terminal 214, the notch 304 is first opened through elastic deformation, and then clamped to the circumferential side wall of the electrode terminal 214 and assembled with the electrode terminal 214. After the assembly, an elastic restoring force of the notch 304 can be used to maintain the engagement with the electrode terminal 214, so as to closely fit the electrode terminal 214. To achieve a stable electrical connection, the connecting portion 301 wraps the electrode terminal 214 by a size greater than or equal to one half of a circumference of the circumferential side wall of the electrode terminal 214 and less than the circumference of the circumferential side wall of the electrode terminal 214. When the electrode terminal 214 protruding from the can 21 is cylindrical, the connecting portion 301 wraps the electrode terminal 214 by an angle greater than or equal to 180 degrees and less than 360 degrees.

As shown in FIG. 8(*c*), an end 305 of the connecting portion 301 at the notch 304 is bent toward the installation plate 31. In this way, the connecting portion 301 does not contact the circumferential side surface of the electrode terminal 214 with the sharp end 305, so that damage to the electrode terminal 214 caused by the end 305 of the connecting portion 301 in the clamping process can be prevented. In addition, the end 305 can be used to fix to the sampling member 30 to further prevent the sampling member 30 from separating from the electrode terminal 214.

In addition, under the condition that the plurality of battery units 10 shown in FIG. 3 are arranged in the second direction Y, the end 305 is accommodated in a gap between adjacent battery units 10 in the direction Y. This can not only reduce damage to the circumferential side surface of the battery cell 20 by the connecting portion 301, but also can effectively use the space.

Figure 9:
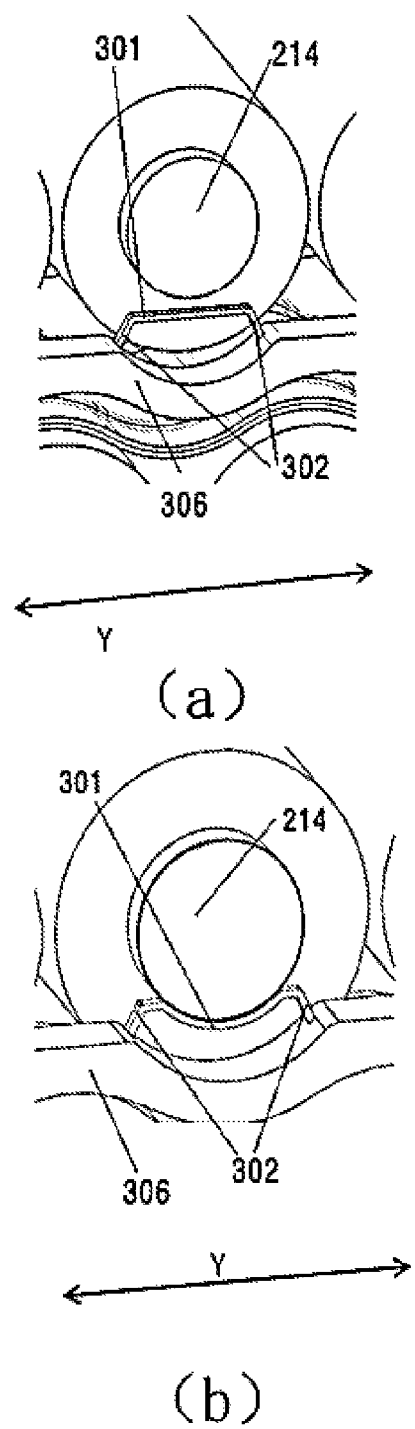
FIG. 9 is a schematic structural diagram of a sampling member according to another embodiment of this application, where

FIG. 9 is a schematic structural three-dimensional diagram of the sampling member 30 according to another embodiment of this application. FIG. 9(*a*) shows a state in which the connecting portion 301 of the sampling member 30 is not in contact with the electrode terminal 214 and has not yet been elastically deformed, and FIG. 9(*b*) shows that the connecting portion 301 of the sampling member 30 is in contact with the electrode terminal 214, elastically deformed, and fits a shape of the circumferential side surface of the electrode terminal 214.

The sampling member 30 has a connecting portion 301 and a fixing portion 302. In this embodiment, the connecting portion 301 is also connected to the circumferential side wall of the electrode terminal 214. The connecting portion 301 is elastic, and when subjected to an external force, the connecting portion 301 is deformed in response to the external force, so as to fit the circumferential side wall of the electrode terminal 214, thereby achieving surface contact with the electrode terminal 214. The external force herein may be the gravity of the battery cell 20 itself, a pressure during battery assembly, a fixing force from another fixing portion, and the like. When the electrode terminal 214 protruding from the can 21 is cylindrical, the connecting portion 301 wraps the electrode terminal 214 by an angle greater than 0 degrees and less than 180 degrees.

In this way, the connecting portion 301 can adaptively fit the circumferential side wall of the electrode terminal 214 through the elastic deformation, to achieve good surface contact with the electrode terminal 214, thereby achieving a more stable electrical connection between the sampling member 30 and the electrode terminal 214. The connecting portion 301 is fixed to a supporting member 306 via the fixing portion 302.

In addition, in an embodiment of this application, the two electrode terminals 214 of each of the battery cells 20 protrude from the can 21 in the direction leaving the interior of the battery cell 20, and in two adjacent ones of the battery cells 20, the electrode terminals 214 of one battery cell 20 are disposed opposite and butt up against the electrode terminals 214 of the other battery cell 20. Furthermore, the electrode terminal 214 of one battery cell 20 and the electrode terminal 214 of the other battery cell 20 are welded together.

In two adjacent ones of the battery cells 20, the electrode terminals 214 of one battery cell 20 directly butt up against the electrode terminals 214 of the other battery cell 20, to achieve the electrical connection, so that components for electrical connection can be reduced and the energy density of the battery can be improved. Moreover, by directly welding the two protruding electrode terminals 214 in this way, a stable electrical connection between two adjacent ones of the battery cells 20 can be achieved.

When the two electrode terminals 214 are welded, uneven welding zones are often formed on the two electrode terminals 214. By staggering the contact zones between the sampling member 30 and the electrode terminals 214 and the welding zones of the electrode terminals 214 in the first direction X, the sampling member can be prevented from being connected to the welding zones to cause poor contact and lower sampling accuracy, so as to improve assembly accuracy.

An embodiment of this application further provides an electric apparatus, where the electric apparatus may include the battery 1 in each of the foregoing embodiments. The battery 1 is configured to provide electric energy in the electric apparatus.

The battery and the electric apparatus in the embodiments of the application are described above, and the method and apparatus for preparing a battery in the embodiment of the application will be described below. For parts not described in detail, reference may be made to the foregoing embodiments.

Figure 10:
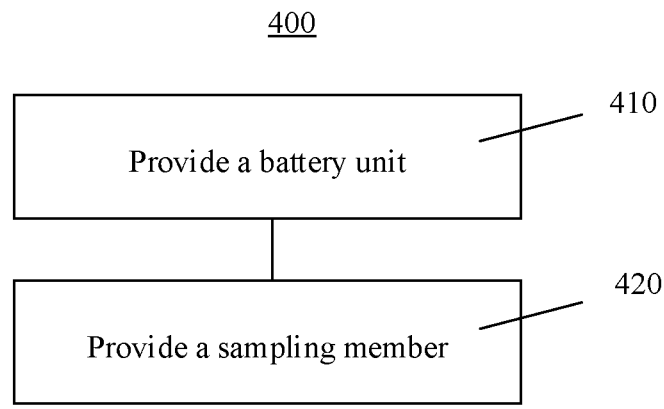
FIG. 10 is a schematic flowchart of a method for preparing a battery according to an embodiment of this application.

FIG. 10 is a schematic flowchart of a method 400 for preparing a battery according to an embodiment of this application. As shown in FIG. 10, the method 400 may include the following steps.

410: Provide a battery unit 10, where the battery unit 10 includes a plurality of battery cells 20, the plurality of battery cells 20 are arranged in a first direction X and electrically connected to each other, each of the battery cells 20 includes a can 21 and two electrode terminals 214 of opposite polarities, the two electrode terminals 214 are respectively disposed at two ends of the can 21 in the first direction X, and at least one of the electrode terminals 214 protrudes from the can 21 in a direction leaving an interior of the battery cell 20.

420: Provide a sampling member 30, where the sampling member 30 is at least partially located between two adjacent ones of the battery cells 20, connected to the electrode terminals 214 protruding from the can 21, and configured to perform signal collection on the connected battery cells 20.

Figure 11:
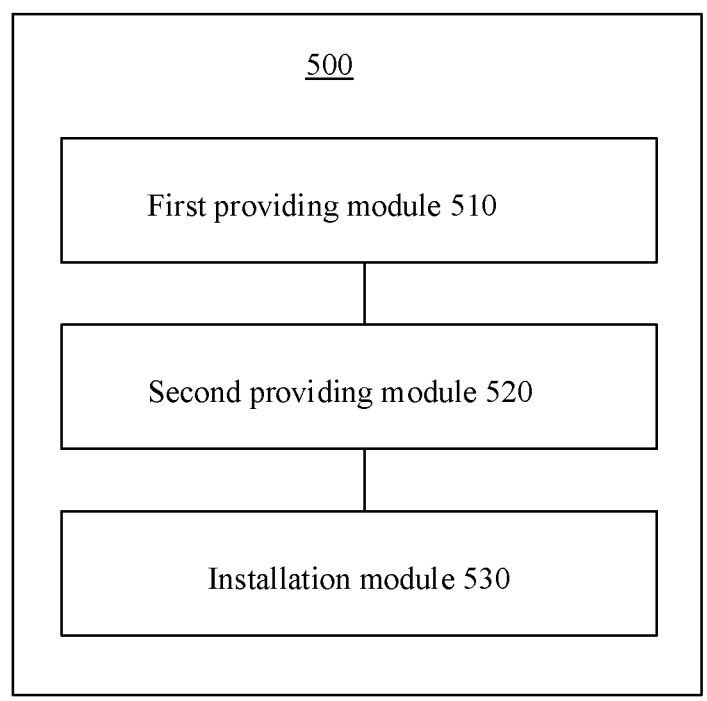
FIG. 11 is a schematic block diagram of an apparatus for preparing a battery according to an embodiment of this application.

FIG. 11 is a schematic block diagram of an apparatus 500 for preparing a battery according to an embodiment of this application. As shown in FIG. 11, the apparatus 500 for preparing a battery may include: a first providing module 510, a second providing module 520, and an installation module 530.

The first providing module 510 is configured to provide a battery unit 10, where the battery unit 10 includes a plurality of battery cells 20, the plurality of battery cells 20 are arranged in a first direction X and electrically connected to each other, each of the battery cells 20 includes a can 21 and two electrode terminals 214 of opposite polarities, the two electrode terminals 214 are respectively disposed at two ends of the can 21 in the first direction X, and at least one of the electrode terminals 214 protrudes from the can 21 in a direction leaving an interior of the battery cell 20. The second providing module 520 is configured to provide a sampling member 30. The installation module 530 is configured to install the sampling member 30 to the battery cell 20, where the sampling member 30 is at least partially located between two adjacent ones of the battery cells 20, connected to the electrode terminals 214 protruding from the can 21, and configured to perform signal collection on the connected battery cells 20.

In conclusion, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A battery, comprising: a battery unit comprising a plurality of battery cells, wherein the plurality of battery cells are arranged in a first direction and electrically connected to each other, each of the battery cells comprises a can and two electrode terminals of opposite polarities, the two electrode terminals are respectively disposed at two ends of the can in the first direction, and at least one of the electrode terminals protrudes from the can in a direction leaving an interior of the battery cell; and a sampling member, wherein the sampling member comprises a connecting portion located between two adjacent ones of the battery cells, connected to the at least one electrode terminal protruding from the can, and configured to perform signal collection on the connected battery cells; wherein the connecting portion of the sampling member is elastically deformable and is arranged to be connected to the at least one electrode terminal protruding from the can by sliding the sampling member along a second direction perpendicular to the first direction and elastically deforming the connecting portion into physical contact with at least a portion of a periphery of the at least one electrode terminal protruding from the can-while the electrode terminals of the two adjacent battery cells are directly connected to each other to achieve electrical connection and wherein the sampling member is not a necessary component to connect electrically the electrode terminals of the two adjacent battery cells.

2. The battery according to claim 1, wherein in the first direction, a gap is formed between two adjacent ones of the battery cells, and said connecting portion of the sampling member is located in the gap.

3. The battery according to claim 2, wherein the connecting portion is connected to a circumferential side wall of the electrode terminal.

4. The battery according to claim 3, wherein the connecting portion is configured to deform in response to an external force to attach to the circumferential side wall of the electrode terminal, so as to achieve surface contact with the electrode terminal.

5. The battery according to claim 3, wherein the at least one electrode terminal protruding from the can is cylindrical, and the connecting portion wraps the electrode terminal by an angle greater than 0 degrees and less than 180 degrees.

6. The battery according to claim 3, wherein the connecting portion is clamped to the circumferential side wall of the electrode terminal.

7. The battery according to claim 3, wherein the connecting portion is fully attached to the circumferential side wall of the electrode terminal.

8. The battery according to claim 3, wherein in the first direction, a size of the connecting portion is the same as a size of the gap.

9. The battery according to claim 3, wherein a size of the connecting portion in the first direction is greater than a thickness of the connecting portion in said second direction.

10. The battery according to claim 6, wherein the connecting portion wraps the electrode terminal by a size greater than or equal to one half of a circumference of the circumferential side wall of the electrode terminal and less than the circumference of the circumferential side wall of the electrode terminal.

11. The battery according to claim 6, wherein the at least one electrode terminal protruding from the can is cylindrical, and the connecting portion wraps the electrode terminal by an angle greater than or equal to 180 degrees and less than 360 degrees.

12. The battery according to claim 6, wherein a plurality of convex portions are provided on an inner surface of the connecting portion, and are configured to clamp the circumferential side wall of the electrode terminal.

13. The battery according to claim 6, wherein the connecting portion is provided with a through hole in the first direction, and the through hole is used to provide a deformation space under the condition that the connecting portion is clamped to the electrode terminal.

14. The battery according to claim 13, wherein the connecting portion is provided with a notch, and the through hole extends to communicate with the notch.

15. The battery according to claim 12, wherein a plurality of concave portions corresponding to the convex portions are formed in the circumferential side wall of the electrode terminal, and the convex portions fit the concave portions.

16. The battery according to claim 1, wherein the two electrode terminals of each of the battery cells protrude from the can in the direction leaving the interior of the battery cell, and in two adjacent ones of the battery cells, the electrode terminals of one battery cell are disposed opposite and butt up against the electrode terminals of the other battery cell.

17. The battery according to claim 16, wherein in two adjacent ones of the battery cells, the electrode terminals of one battery cell are welded together with the electrode terminals of the other battery cell.

18. The battery according to claim 1, wherein in two adjacent ones of the battery cells, the electrode terminals of one battery cell are welded together with the electrode terminals of the other battery cell, and contact zones between the sampling member and the electrode terminals and welding zones of the electrode terminals are staggered in the first direction.

19. An electric apparatus, comprising the battery according to claim 1, wherein the battery is configured to supply electric energy.

20. An apparatus for preparing a battery, comprising: a first providing module, configured to provide a battery unit, wherein the battery unit comprises a plurality of battery cells, the plurality of battery cells are arranged in a first direction and electrically connected to each other, each of the battery cells comprises a can and two electrode terminals of opposite polarities, the two electrode terminals are respectively disposed at two ends of the can in the first direction, and at least one of the electrode terminals protrudes from the can in a direction leaving an interior of the battery cell; a second providing module, configured to provide a sampling member; and an installation module, configured to install the sampling member to the battery cell, wherein the sampling member has a connecting portion located between two adjacent ones of the battery cells, connected to the electrode terminals protruding from the can, and configured to perform signal collection on the connected battery cells; wherein the connecting portion of the sampling member is elastically deformable and is arranged to be connected to the at least one electrode terminal protruding from the can by sliding the sampling member along a second direction perpendicular to the first direction and elastically deforming the connecting portion into physical contact with at least a portion of a periphery of the at least one electrode terminal protruding from the can;while the electrode terminals of the two adjacent battery cells are directly connected to each other to achieve electrical connection and wherein the sampling member is not a necessary component to connect electrically the electrode terminals of the two adjacent battery cells.

\* \* \* \* \*